Oct. 28, 1958    D. B. COHEN    2,857,830
COLOR SLIDE NEGATIVE PRINTER AND DUPLICATOR
Filed March 24, 1955

INVENTOR
DAVID B. COHEN

BY *G. D. O'Brien*
*Q. Baxter Warner*

*Attorneys*

United States Patent Office 2,857,830
Patented Oct. 28, 1958

2,857,830

COLOR SLIDE NEGATIVE PRINTER AND DUPLICATOR

David B. Cohen, Arlington, Va.

Application March 24, 1955, Serial No. 496,628

3 Claims. (Cl. 95—75)

(Granted under Title 35, U. S. Code (1952), sec. 266)

The present invention relates to a color slide negative printer and duplicator and more particularly to a color slide negative printer and duplicator adapted to provide a simple, reasonable, and convenient means for obtaining negatives from color slides so that black and white prints can be made as well as a means of making color duplicates of transparencies.

It is already known that identical sized negatives or color duplicates can be made of color transparencies by using a contact printer and cut film. Also, enlarged black and white negatives of color slides or duplicates of color transparencies can be made by using cut film and an enlarger. However, these well known methods are slow and tedious, since in these methods it is necessary for the operator to physically handle the film. Also since most of the steps necessary in these presently known methods are necessarily conducted in total darkness, poorer negatives and transparencies with either lint, dust or finger prints thereon result. In the enlarger method, there is present the difficulty of getting a sharp negative or duplicate transparency when a small one is desired due to focusing difficulties.

The present color slide negative printer and duplicator provides black and white negatives or color duplicates from 35 mm. color slides using 35 mm. roll film which is much cheaper than cut film. The negatives or duplicates can be made without handling the film and an enlarger is not required. Further, any diffused light source is suitable for exposure of black and white film as long as the negative printer can be placed directly over or under it. There is no problem of focusing the device to obtain sharp negatives since there are no lens in the subject printer. Any number of exposures can be made, and development thereof can be accomplished immediately or when time permits. The device provides the operator with a simple, reasonable, and convenient means of obtaining negatives from color slides so that black and white prints can be made as well as a means of making duplicate color transparencies.

In general, the present invention consists of two compartments separated by a coupling bridge structure which embodies a track for the edges of the film, one of the compartments contains the roll of unexposed film and other compartment having a cartridge and spool for the exposed film, transport means for pulling the film from one chamber to the other, and releasable locking means for a predetermined control of said transport means. The coupling bridge structure is provided with an aperture to admit light for exposure of the film and is further provided with a tray perpendicularly slidable relative to said coupling bridge structure to provide mounting means for the color transparency to be reproduced and to control the light and its effect on said film.

An object of the present invention is the provision of a device for making identically-sized color duplicates on roll-form color film.

Another object is to provide a device for making identically-sized black and white negatives on roll-form black and white film.

A further object of the invention is the provision of a color slide negative printer and duplicator wherein the negatives or duplicates are made without handling the film and without utilizing an enlarger.

Another further object is to provide an economical and simple color slide negative printer and duplicator so that black and white prints can be made as well as a means of making duplicate color transparencies.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 2:
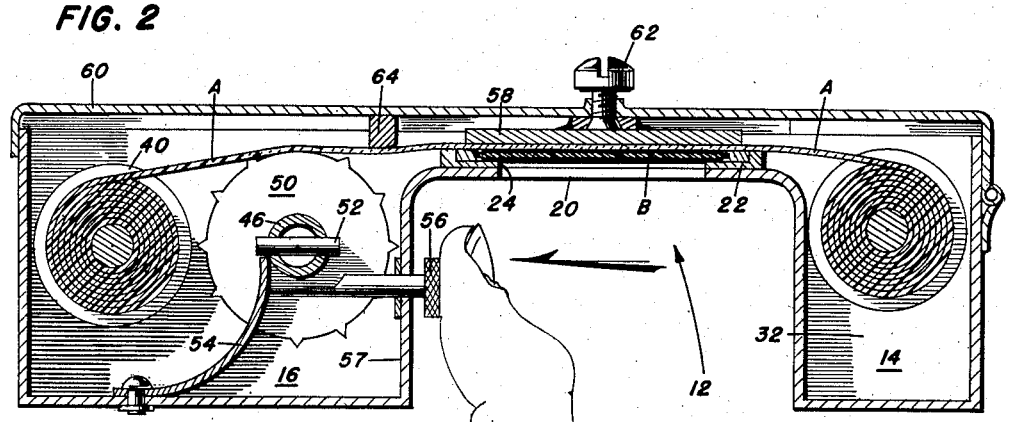
Figure 2 is a sectional side view of the apparatus shown in Figure 1, illustrating the pertinent operational features of the subject invention.

Referring now to the drawings, there is illustrated a preferred embodiment comprising a negative printer 12 for making identically-sized duplicates on roll-form color film or negatives on roll-form black and white film, having an unexposed film cartridge roll compartment 14, and exposed film compartment 16 and a film track 18 forming a bridge between compartments 14 and 16 having a bridge opening 20 for passage of light from a conventional light-source. A tray 22 is slidably mounted in axially opposed rectangular slots 23, which are an integral part of the bridge structure, cross-wise to the compartments 14 and 16 and provided with an opening 24 for the hereinafter stated reasons. Tray 22 is slidable to an out first position so that the opening 24 is not in a juxtaposed position relative to the bridge opening 20 but in position, for example, to mount a color transparency therein. The tray 22 is slidable to a housed second position to enable the tray opening 24 and the color transparency element mounted thereon to axially register with the bridge opening 20. The printer 12 can be cast from aluminum, stamped out of sheet metal, such as copper or the like, or made of plastic.

A manually rotatable knob 26 is mounted on a spindle 27 slidably journaled in a wall 28 of the chamber 14 so as to protrude within said chamber. The spindle 27 is provided with a circular flange 30, axially secured thereon and a spring 31 is concentrically mounted about the spindle 27 to maintain biasing of the flange with the film cartridge spindle. Also, the spindle 27 protrudes inward from the flange 30 to provide a positive engagement with the cartridge spindle receiving means. Axially spaced from the flange 30 and secured to an opposite wall 32 of said chamber 14 is a mounting bracket 34 for journaling therein one end of the conventional film cartridge spindle.

The exposed film compartment 16 is provided with a manual knob 36 mounted on a spindle 33 journaled in a wall 38 of the compartment 16. The knob 36 and spindle 33 are provided with an axial flange 40 fixed to said spindle within the compartment 16 and having a spring 35 concentrically mounted on the spindle 33 between flange 40 and wall 38 operating in a manner similar to flange 30; that is, to maintain the film magazine mounted within the chamber 16 in its proper operating position. To maintain the film magazine and the spindle 33 rotatably fixed relative to each other, a groove portion 37 is provided on the interior end of the spindle 33 for positive engagement with the film magazine spindle. Axially opposed to the flange 40 is a bracket 42 internally secured to a wall 44 of the chamber 16, and adapted with flange 40 to receive, in a manner similar to flange 30 and bracket 34, an empty cartridge and spool for receiving the free end of a film A from the film roll mounted within chamber 14. A spindle 46 is mounted within chamber 16 parallel to spindle 33 with one end mounted in a bracket 47 secured within chamber 16, such as by welding or the like, and having the other end of said spindle extending through wall 38 and journaled therein. A manually operative knob 48 is provided on the spindle 46 so that said knob 48 is coplanar with knob 36 but spaced therefrom to facilitate the independent operation of each knob.

Fixedly mounted on spindle 46 are a pair of transport gears 50 adjacent to the empty cartridge and spool position within chamber 16 and axially spaced from each other to engage the sprocket holes in the film A for pulling the same from the first compartment 14. A pin 52 is perpendicular fixed through the spindle 46 at substantially its midpoint and adapted to engage a spring 54 which has one end secured to the bottom of chamber 16 to thereby provide a locking device for stopping the transport gears after a predetermined amount of rotation.

The transport gears 50 are arranged so as to move the film A one frame over the bridge opening 20 and the tray aperture 24 for every 180° rotation of the knob 48 and the spindle 46. Accordingly, the rotation of the spindle 46 is controlled by having the pin 52 contacting the spring 54, whenever released as hereinafter disclosed. The spring 54 consists of a leaf spring having one end secured to the bottom of chamber 16 and having the other end biasing the spindle 46 at substantially the location of the pin 52. Accordingly, any rotation of the spindle 46 is resisted by the spring 54 whereupon said spindle 46 will be operatively locked whenever one of the extended ends of pin 52 contacts the spring 54 in the manner shown in Figure 2.

In this manner, film movement is controlled a predetermined amount so as to accurately measure the film A for framing over openings 20 and 24.

Figure 3:
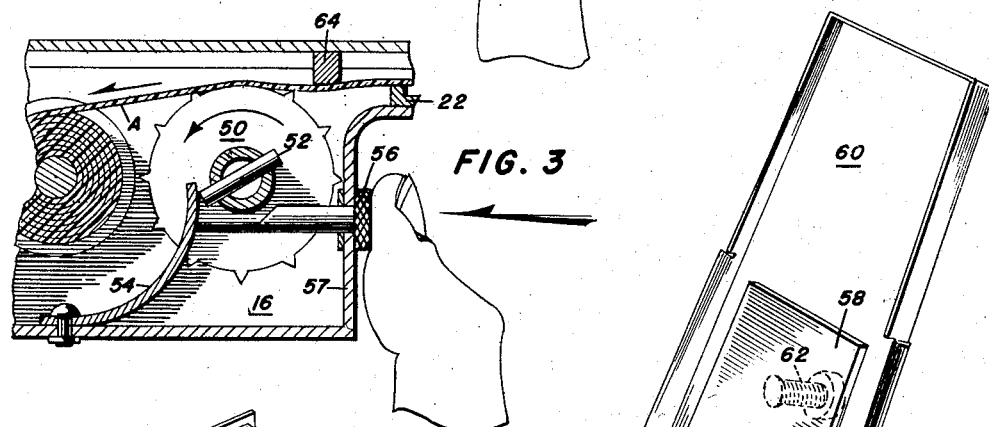
Figure 3 is a sectional side view of the apparatus showing the exposed film chamber and the film movement controlling device situated therein.
Figure 1:
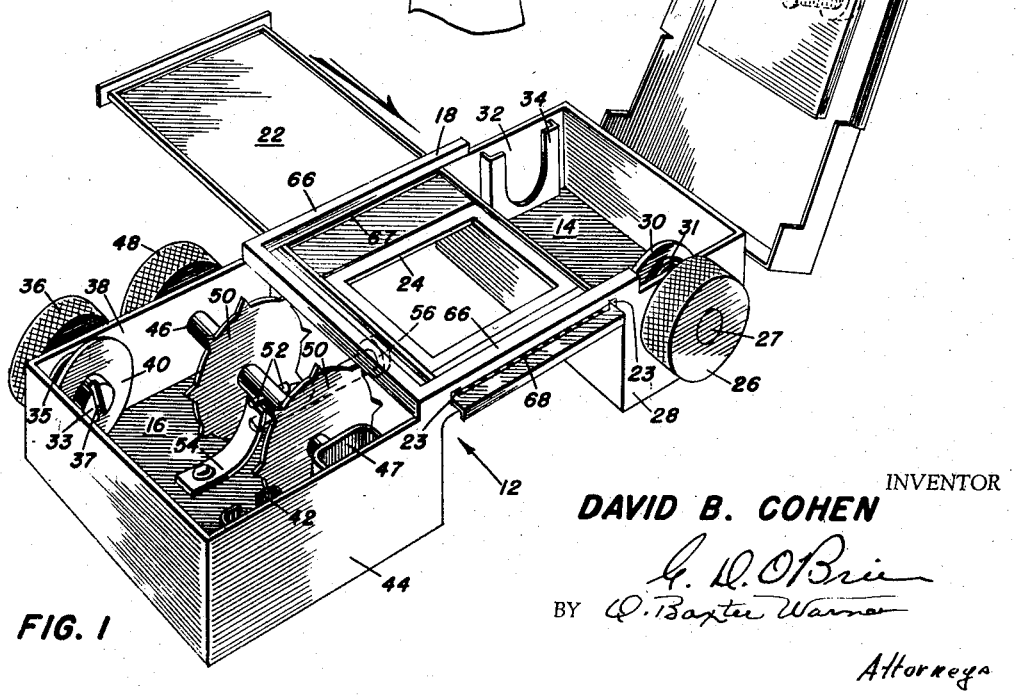
Figure 1 is a perspective view of a preferred embodiment of the color slide negative printer and duplicator.

A release plunger 56 is provided slidably mounted on wall 57 of chamber 16 so as to operatively engage the free end of spring 54 in a manner to rotatably release the spindle 46. The plunger 56 is manually operated, as shown in Figures 2 and 3, and constructed with a configuration so as to prevent interaction between the plunger and the spindle 46. Thus, plunger 56 will be manually operated to free the locking device, consisting of the pin 52 and the spring 54, preparatory to rolling the film in the next frame position. A pressure plate 58 is provided to urge the unexposed film and transparency B into complete contact.

The pressure plate 58 is mounted on the interior surface of cover 60 which is hinged at one end of the printer 12 adjacent the chamber 14, and is controlled by means of a thumb screw 62 freely journaled in the pressure plate and threadably engaging the cover 60. Thus rotation of the thumb screw 62 will control the spacing of said pressure plate 58 relative to the cover 60 and the transparency being duplicated.

The printer 12 is provided with a film roll guide 64 integral therewith and adapted to maintain the film A in engagement with the transport gears 50 and to prevent any film slack from occurring in its movement. Further, the film track 18 is provided with light closures 66 which are integral with said negative printer and have secured thereon strips of resilient matter 68, such as rubber, or the like, to contact the tray 22 to further prevent the entrance of light within the film track 18. The light closures 66 are formed with internal grooves 67 to maintain the film A in its intended path in traveling from chamber 14 to chamber 16.

In operating the negative printer and duplicator 12, the cover 60 is opened and a roll of film, such as a 35 mm. panchromatic type or a roll of Ansco color duplicating film for making duplicate transparencies, is inserted within chamber 14 and one end mounted within the journal bracket 34 and the other end engaging the end of the spindle 27 protruding beyond the flange 30. After reaving the film A under the internal grooves 67 and under the film guide 64, the tail of the film is attached to a spool from an empty cartridge with adhesive tape, or the like, whereupon the spool is replaced in its cartridge with the film free to roll. The cartridge is placed in the housing 16 mounted in the journal bracket 42 and on the spindle 36 so that the side perforations on the film A are engaging the teeth of the transport gears 50.

The tray 22 is moved to the out position so that the aperture 24 upon which the color slide or transparency B fits is in the out position. The other end of the tray will now blank off the opening 20 in the bottom of the film track 18 through which light must enter to expose the film. The hinged cover 60 of the negative printer is closed and the device is ready for use whereupon engaging knob 36 is rotated to pass substantially two frames of film by releasing the transport gears 50 and pushing the release button 56 for each frame. In this manner an unexposed frame will be placed over the aperture 24 of the slidable tray 22. A 35 mm. color slide, for example, is now placed emulsion side upward into the compartment on the tray, and whereupon the necessary operations may be conducted in normal light. At this point, the printer 12 should now be taken into a dark room for the remainder of the process.

The light source for exposing black and white film in the printer may be any type of diffused light, while for exposing Ansco duplicating film a tungsten lamp with a color temperature of approximately 3000 K. with the color compensating filters recommended by the film manufacturer should be used. The printer 12 is placed a known distance from the light source selected, setting it up so that it can be moved and replaced in the dark and with all lights out, the tray 22 is pushed to the in position so that the 35 mm. color slide is in under the unexposed film, and the aperture 20 in the bottom of the film track is opened to allow light to enter therein. The thumbscrew 62 is rotated to move the pressure plate down so that the film will be placed into complete contact with the color slide. At this point, printer 12 is opened so that when the light source is turned on, the film will be exposed. To determine correct exposure times for initial operation, a few test frames should be exposed.

The exposure time required depends on the intensity of the light source, the distance the printer is from the light, the density of the color slide, and the speed of the film used. These elements are easily determined for each instance of operation. After each exposure has been made, the thumbscrew 62 is rotated to release the pressure on the film. If another exposure is to be made of the same slide, the push button 56 is momentarily released to enable the transport gears 50 to rotate 180° and the engaging knob 36 is rotated to roll a new frame of film into place on the film track 18.

If an exposure is to be made of another color slide, the tray 22 is pulled out after releasing pressure plate 58 and the new slide put in place over the aperture 24. The tray 22 is pushed in and the above procedure followed as to exposure of the film. Upon exposure of the total negatives desired, substantially two extra frames of film are rolled off to insure that the exposed film is rolled into the exposed cartridge mounted within chamber 16, and the tray 22 moved to the out position so that the aperture 24 is out of the film track 18. At this point of the operation, lights may be turned on and the cover of the printer can be opened whereupon the exposed roll of film can be removed and developed when the user desires. Accordingly the negative printer 12 will provide the operator with a simple and reasonable means of obtaining negatives from color slides so that black and white prints can be made as well as a means of making color duplicates.

Further modifications to the printer 12 may be a film frame counter to keep the user informed of the amount of film remaining unexposed, and a film cutter may be installed to cut the film when the whole roll is not utilized. Further, a more elaborate device could be made by including a diffused light source, either battery or A. C. powered, and a focal plane type shutter with a regular timing device with settings of bulb and from $1/10$ to 14 seconds.

It should be understood, of course, that the foregoing disclosure relates to only a preferred embodiment of the invention and that it is intended to cover only changes and modifications of the example of the invention herein chosen for the purpose of the disclosure, which do not constitute departures from the spirit and scope of the invention as set forth in the appended claims.

What is claimed is:

1. A color slide negative printer, adapted to utilize cartridge roll film having walls defining a first housing, walls defining a second housing, bridge means embodying a film track coupling said first and second housing, said bridge means defining an exposure aperture for the passage of light and being provided with aligned receiving openings at opposite sides thereof, cover means hinged to one of said housings and adapted in an operative position to prevent light penetration into said first and second housings and into said bridge means, tray means defining an aperture at one end thereof for receiving a transparency and a close fitting light masking portion at the opposite end thereof, said tray means being slidably mounted through said side openings in said bridge means for alternative adjustment of the tray between a first position of juxtaposed registration of the tray and bridge apertures and a second masking position of contiguous registration of the tray masking portion with the bridge aperture, said side openings being provided with resilient lightproof strips engaging said tray and preventing the entrance of light into said bridge means when said tray is in said second position, the tray aperture being positioned exteriorly of the printer when the tray is in the second position, one of said housings having gear means mounted therein for effecting movement of the film from one housing to the other, lock means operatively coupled to said gear means for controlling the movement of the film, an adjustable pressure plate threaded on said cover means and cooperating with said track means for insuring complete contact between the film and color slide, said lock means including a spring, a pin mounted on said gear means for locking engagement with said spring, and a release plunger operatively engaging said spring to disengage the latter from said pin and thereby free the gear means for rotation.

2. A color slide negative printer and duplicator utilizing cartridge roll film comprising walls defining an unexposed film chamber, walls defining an exposed film chamber, enclosed track means rigidly coupling said chambers and having aligned openings in opposite sides thereof, another portion of said walls defining an exposure aperture for the passage of light, an elongated tray slidably carried between said openings of said film track means, said tray having a masking portion at one end thereof close fitting with said openings and said exposure aperture, said tray defining a transparency-receiving aperture at the other end thereof whereby the tray may be moved between a position to tightly mask the film from exposure and a position in which the film will be exposed, the transparency-receiving aperture being positioned exteriorly of the device for insertion and removal of transparencies when the tray is moved to the masking position, said side openings being provided with resilient lightproof strips engaging said tray, film transmitting gears journaled in said exposed film chamber and having manually operated stopping means for controlling the movement of the film from the unexposed film chamber through the film track means and over the exposure aperture.

3. A negative printer utilizing unexposed cartridge roll-form film for making negatives of color transparencies comprising an unexposed film compartment, an exposed film compartment, a film track bridging said compartments, said film track being provided with aligned openings on opposite edges thereof, a portion of said film track defining a first aperture centrally located in the broad side of said film track for passage of light therethrough, a tray member slidably mounted through said aligned openings in said film track and perpendicular thereto, a portion of said tray defining a second aperture located on one end of said tray member and adapted for movement into and out of registry with the first aperture, means coincident with said second aperture on said tray for receiving thereon the color transparencies to be duplicated, a second portion on said tray defining a masking portion close fitting with said openings and said first aperture when said first and second apertures are completely out of registry, first journaling means provided in said unexposed compartment for supporting the cartridge roll-form film, second journaling means provided in said exposed compartment for supporting therein the exposed film cartridge, transport gears mounted in said exposed compartment adapted to pull the film from the unexposed compartment, a spring having one end secured to said exposed compartment, a pin secured to said transport gears for engagement with the other end of said spring to limit rotation of the gear, a plunger type release device mounted on said exposed compartment and contacting said spring for manually releasing the same from engagement with said pin, and an adjustable pressure plate associated with said film track to bring the film and negative into complete contact.

References Cited in the file of this patent

UNITED STATES PATENTS

| 829,936 | Woodill | Aug. 28, 1906 |
| 883,617 | Bragg | Mar. 31, 1908 |
| 1,929,816 | Hanson | Oct. 10, 1933 |

FOREIGN PATENTS

| 321,911 | Germany | June 15, 1920 |
| 515,968 | France | Dec. 1, 1920 |
| 423,159 | Germany | Dec. 21, 1925 |